United States Patent
Virtser et al.

(10) Patent No.: US 11,606,359 B1
(45) Date of Patent: Mar. 14, 2023

(54) CLOUD SERVICE AUTHENTICATION MICROSERVICE

(71) Applicant: monday.com Ltd., Tel Aviv (IL)

(72) Inventors: David Virtser, Givatayim (IL); Daniel Mittelman, Tel Aviv (IL)

(73) Assignee: monday.com Ltd., Tel Aviv (IL)

( * ) Notice: Subject to any disclaimer, the term of this patent is extended or adjusted under 35 U.S.C. 154(b) by 0 days.

(21) Appl. No.: 17/565,715

(22) Filed: Dec. 30, 2021

(51) Int. Cl.
*H04L 9/40* (2022.01)
*H04L 67/56* (2022.01)

(52) U.S. Cl.
CPC ........ *H04L 63/0884* (2013.01); *H04L 63/123* (2013.01); *H04L 67/56* (2022.05)

(58) Field of Classification Search
CPC .................................................. H04L 63/0884
See application file for complete search history.

(56) References Cited

U.S. PATENT DOCUMENTS

| | | | | |
|---|---|---|---|---|
| 2018/0191701 | A1* | 7/2018 | Kong | H04L 63/083 |
| 2018/0198845 | A1* | 7/2018 | Kulp | G06F 9/54 |
| 2021/0168128 | A1* | 6/2021 | Carru | H04L 63/0428 |
| 2021/0218726 | A1* | 7/2021 | Sundararajan | H04L 63/0853 |

FOREIGN PATENT DOCUMENTS

WO    WO-2019243429 A1 * 12/2019 ............. H04L 41/22

OTHER PUBLICATIONS

Rongxu Xu, Wenquan Jin, Dohyeun Kim, Microservice Security Agent Based on API Gateway in Edge Computing, Nov. 10, 2019, Sensors 2019, pp. 1-17 (Year: 2019).*

\* cited by examiner

*Primary Examiner* — Esther B. Henderson

(57) ABSTRACT

A method of authenticating requests to a cloud service, comprising using one or more edge proxy servers of a container execution system facilitating a cloud service to execute an authentication microservice configured for forwarding, to a login service, each login request received by the edge proxy server, via one or more network, from one or more client devices used by respective users to establish sessions with application(s) executed by application server(s) of the container execution system wherein the login service is configured to authenticate the respective user based on credentials extracted from the login request and create one or more session tokens transmitted to the one or more client device, extracting the session token(s) from each subsequent request received by the edge proxy server from the one or more client devices pertaining to the respective sessions, and authenticating the respective subsequent request by verifying the session token(s).

20 Claims, 5 Drawing Sheets

US 11,606,359 B1

CLOUD SERVICE AUTHENTICATION MICROSERVICE

BACKGROUND

The present invention, in some embodiments thereof, relates to authenticating requests for accessing a cloud service, and, more specifically, but not exclusively, to authenticating requests to a cloud service using an independent authentication microservice executed by an edge proxy server of the cloud service.

Distribution, deployment and usage of cloud services and web based applications is constantly increasing as cloud services have become a cornerstone for a plurality of applications spanning across almost all aspects of modern life, from finance and commercial markets, through data technology and design (e.g. software design) activities to gaming and leisure applications.

However, since they are highly accessible, preserving and ensuring security, safety and/or privacy of the cloud services against potential malicious accesses and/or attacks may be a major challenge. Multiple protection means, provisions and/or protocols may be therefore applied to monitor access to the cloud service in attempt to control the requests and verify they originate from authorized users and/or equipment.

SUMMARY

According to a first aspect of the present invention there is provided a method of authenticating requests to a cloud service, comprising using one or more processors of one or more edge proxy servers of a container execution system facilitating a cloud service for executing an authentication microservice. The authentication microservice is configured for:

Forwarding, to a login service, each login request received by the edge proxy server, via one or more networks, from one or more client devices used by respective users to establish sessions with one or more applications executed by one or more application servers of the container execution system. The login service is configured to authenticate the respective user based on credentials extracted from the login request and create one or more session tokens transmitted to the one or more client devices.

Extracting the one or more session tokens from each subsequent request received by the edge proxy server from the one or more client devices pertaining to the respective sessions.

Authenticating the respective subsequent request by verifying the one or more session tokens.

According to a second aspect of the present invention there is provided a cloud service, comprising a container execution system deployed to facilitate the cloud service and comprising one or more edge proxy servers and one or more application servers. The one or more edge proxy servers are configured to execute an authentication microservice configured for:

Forwarding, to a login service, each login request received by the edge proxy server, via one or more networks, from one or more client devices used by respective users to establish sessions with one or more applications executed by one or more application servers of the container execution system. The login service is configured to authenticate the respective user based on credentials extracted from the login request and create one or more session tokens transmitted to the one or more client devices.

Extracting the one or more session tokens from each subsequent request received by the edge proxy server from the one or more client devices pertaining to the respective sessions.

Authenticating the respective request by verifying the one or more session tokens.

In a further implementation form of the first and/or second aspects, the login service is integrated in the one or more applications.

In a further implementation form of the first and/or second aspects, the login service is implemented by a login microservice executed by the edge proxy server.

In a further implementation form of the first and/or second aspects, the one or more session tokens comprise a json web token (JWT) inserted in a cookie embedded in a browsing application executed by the one or more client devices for accessing the one or more applications.

In a further implementation form of the first and/or second aspects, the authentication microservice is configured to verify the one or more session tokens by verifying a cryptographic signature of the one or more session tokens created by the login service.

In a further implementation form of the first and/or second aspects, the authentication microservice is further configured to enrich one or more subsequent requests by inserting one or more additional data items to the one or more subsequent requests.

In a further implementation form of the first and/or second aspects, the one or more additional data items comprise geographical routing information relating to a target geographical region of the respective user. The geographical routing information is extracted from the one or more session tokens embedded in the one or more subsequent requests.

In an optional implementation form of the first and/or second aspects, the cloud service is a multi-region cloud service facilitated by a distributed container execution system comprising a plurality of edge proxy servers deployed in a plurality of geographical regions to receive, via the one or more networks, a plurality of requests to access the one or more applications from a plurality of client devices and a plurality of application servers deployed in the plurality of geographical regions each communicatively coupled to one or more of the plurality of edge proxy servers deployed in the same geographical region. Wherein each edge proxy server is configured to perform the following for each subsequent request, after authenticated by the authentication microservice:

Determine a target geographical region of each subsequent request based on the geographical routing information extracted from the respective subsequent request, and transmit the respective subsequent request to one or more application servers of the multi-region cloud service deployed in the geographical region of the edge proxy server in case the target geographical region is the geographical region of the respective edge proxy server, or Transmit the respective subsequent request to one or more other edge proxy servers deployed in the target geographical region in case the target geographical region is not the geographical region of the respective edge proxy server. The one or more other edge proxy servers are configured to transmit the one or more subsequent requests to one or more application servers deployed in the target geographical region.

In a further implementation form of the first and/or second aspects, the respective edge proxy server is communicatively coupled to one or more of the plurality of application servers deployed in the same geographical region via one or more Virtual Private Cloud (VPC) networks facilitated by the distributed container execution system.

In a further implementation form of the first and/or second aspects, the respective edge proxy server is communicatively coupled to the one or more other edge proxy servers deployed in a different geographical region via one or more peering connection facilitated by the distributed container execution system.

In a further implementation form of the first and/or second aspects, each of the plurality of edge proxy servers is configured to determine a destination for transmitting the respective request based on one or more routing rules.

In a further implementation form of the first and/or second aspects, the distributed container execution system is deployed using one or more cloud computing platforms.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks automatically. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of methods and/or systems as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars are shown by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
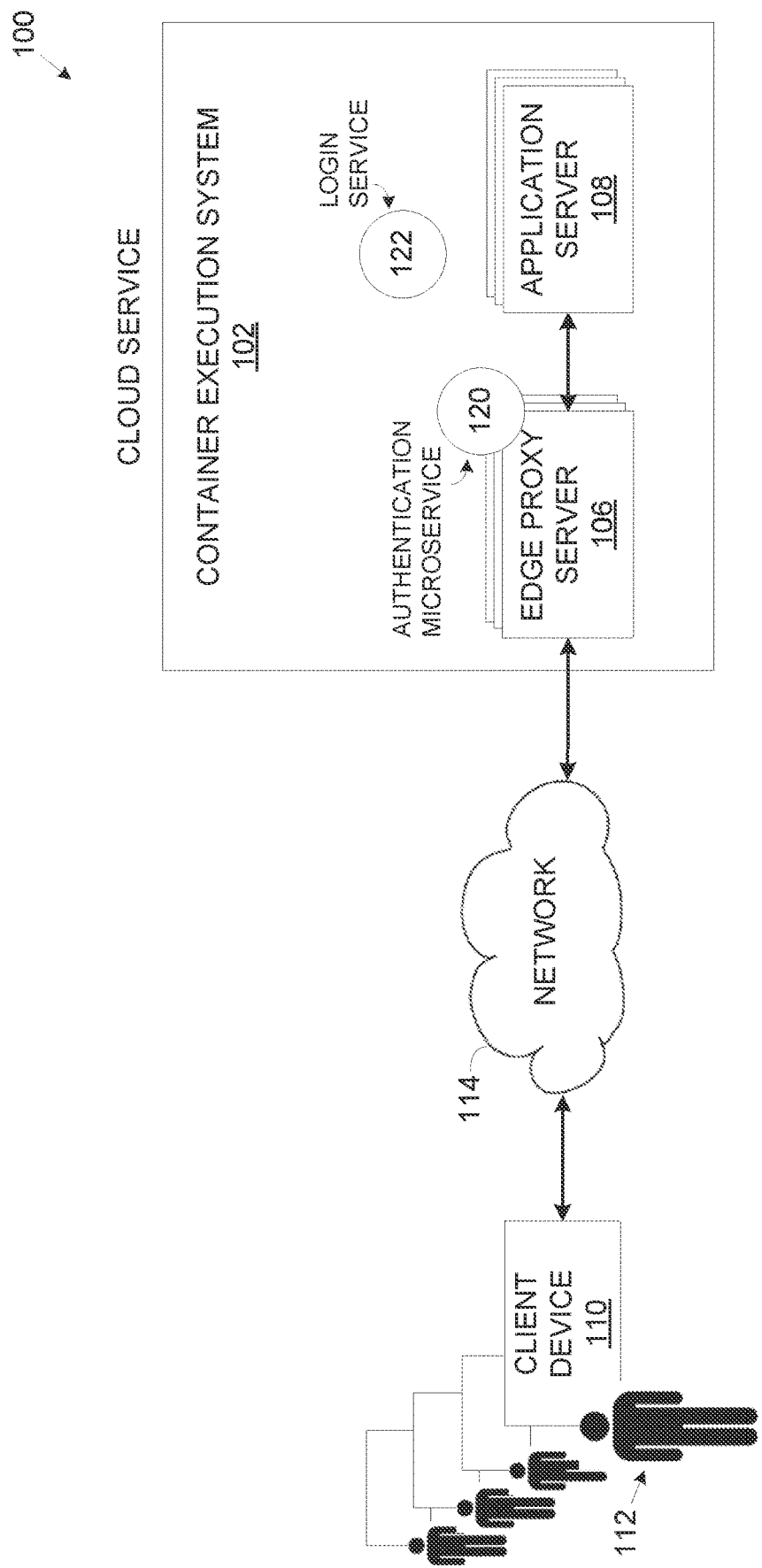
FIG. 1 is a schematic illustration of an exemplary cloud service configured to authenticate access requests using an independent authentication microservice, according to some embodiments of the present invention.

The present invention, in some embodiments thereof, relates to authenticating requests for accessing a cloud service, and, more specifically, but not exclusively, to authenticating requests to a cloud service using an independent authentication microservice executed by an edge proxy server of the cloud service.

According to some embodiments of the present invention, there are provided methods, systems, and computer program products for using authentication microservices to authenticate requests originating from a plurality of client devices used by respective users to access a cloud service offering one or more applications, services, and/or the like.

The cloud service may be typically utilized using virtualization technology, for example, Virtual Machines (VM) and moreover a virtualized container environment in which, services, applications, processes and/or workloads may be each executed using a standalone container (or Docker in Linux environment) which may be easily deployed and/or instantiated cross-platform, cross Operating System (OS) in the virtual environment practically independently of the hosting environment.

For efficient deployment, execution, scalability and performance, the multi-region cloud service may be therefore facilitated by a container execution system, for example, Kubernetes and/or the like configured to provide an orchestration platform for managing containerized workloads, services and applications.

The container execution system may comprise one or more edge proxy servers (frontend servers) deployed at the edge of the cloud service to provide and manage access to the cloud service, specifically to one or more application servers configured to execute one or more of the applications, services, datacenters, tools and/or utilities (collectively designated applications herein after) offered by the cloud service. Functionally of the edge server(s) controlling, managing and/or routing the requests to the cloud service may therefore include, for example, ingress control, Domain Name Service (DNS), load balancing, reverse proxy and/or the like.

Optionally, the cloud service, specifically the container execution system may be deployed and/or utilized using one or more cloud services, platforms and/or infrastructures, such as, for example, Amazon Web Service (AWS), Google Cloud, Microsoft Azure and/or the like. For example, one or more Virtual Private Clouds (VPC) may be deployed to facilitate the cloud service.

While the requests originating from the client devices to access the cloud service may include anonymous requests which may be unauthenticated and thus have limited access to the cloud service applications and/or resources, typically each request may be first authenticated before granted access and routed to the applications and/or resources of the cloud service. Authenticating each access request may increase robustness, security, safety and/or privacy of the cloud service to potential malicious accesses, cyberattacks and/or the like initiated in order to compromise the cloud service and gain access to resources and/or data of the cloud service.

One or more authentication agents may be therefore deployed to authenticate the incoming access requests. In particular, one or more authentication microservices may be deployed and executed as containers (e.g., Dockers) by the edge server(s) of the cloud service to authenticate the requests such that each request may be authenticated at the very edge of the cloud service.

In order to establish a session with one or more of the application(s) of the cloud service, one or more of the client devices used by respective users may transmit a login request comprising access (login) credentials of the user.

When a login request is received at the edge proxy server, the authentication microservice may identify the login request as such and may forward the login request to a login service which may be integrated with the application(s) and/or deployed as one or more microservices containers executed by the edge proxy server(s) and/or by the application server(s) and/or a combination thereof.

The login service may be configured to extract the credentials from each received login request and authenticate the respective user and/or his client device by verifying the extracted credentials compared to stored credentials retrieved from account records maintained to store at least the credentials of all users authorized to access the cloud service.

In case the credentials are successfully verified and the user is successfully authenticated to be who he claims to be, the login service may create one or more session tokens for one or more sessions established between one or more of the client devices and one or more of the application(s) of the cloud service. The session token(s) may be used to authenticate each subsequent requests originating from the respective client device during the session established with the cloud service and optionally during one or more future sessions.

The login service may further provide (transmit) the session token(s) to the respective client device. One or more methods, techniques and/or algorithms may be applied for creating the session token(s) and providing it to the client device. For example, one or more of the session tokens may comprise a JSON Web Token (JWT) which may be transmitted back to the receptive client device and embedded, for example, as a cookie in a browsing application executed by the client device for accessing the cloud service. In another example, one or more of the session tokens may be transmitted to the receptive client device which may embed the session token(s) in each subsequent request to access the cloud service.

Optionally, one or more of the session token(s) may further include additional information relating to the respective user and/or to the client device he uses, for example, geographical routing information indicative of a geographical region associated with the respective user. The geographical routing information may be retrieved, fetched and/or otherwise obtained from the account records comprising information of the respective user. The geographical routing information may indicate a target geographical region associated with the user, for example, the geographical region where the user lives, the geographical region where the user works, the geographical region where a company in which the user works is located and/or the like.

Typically, the login service may create a signature, specifically a cryptographic signature for one or more of the session token(s), for example, for the JWT. The signature may be later used for verifying that the session token(s) is a valid token, verifying the creator of the session token and/or verifying that the session token has not been tampered. One or more cryptographic methods, techniques and/or algorithms may be applied for creating the session token signature, for example, symmetric key encryption, asymmetric key encryption and/or the like.

Each client device that is authenticated by the login service may therefore embed one or more of the session token(s) and/or part thereof in each subsequent request pertaining to the session established with the application(s) of the cloud service.

The authentication microservice may extract the session token(s) embedded and/or included in each subsequent request and may attempt to authenticate the respective subsequent request by verifying the extracted session token(s), for example, by applying one or more of the cryptographic algorithms to verify the signature of the session token(s).

The authentication microservice may therefore authenticate each subsequent request for which the session token(s) is successfully verified while the authentication may fail for subsequent requests for which the session token(s) may not be successfully verified. The authenticated subsequent requests may be forwarded, for example, transmitted to their destination application server(s) while subsequent requests which failed to authenticate may be blocked.

Optionally, the authentication microservice may further enrich one or more of the subsequent requests, specifically the authenticated subsequent requests to include one or more additional data items. For example, the authentication microservice may extract from one or more of the session token(s) additional information included in it by the login service, for example, the geographical routing information.

According to some embodiments the cloud service may be a multi-region cloud service globally accessible from a plurality of geographical regions which may typically include a primary geographical region and one or more secondary geographical regions.

Specifically, the multi-region cloud service may be configured to provide global access while maintaining and ensuring privacy of private data associated with each region such that the private data relating to each geographical region is not shared, distributed, exchanged, transmitted, replicated, exposed and/or otherwise exported out of the respective geographical region.

The private data which may be accumulated in each of the geographical regions for the users associated with the respective geographical may include practically any data designated as private, sensitive secure and/or the like, for example, data relating to users of the multi-region cloud service, for example, personal information, financial information, medical information, business sensitive information (e.g. trade secrets, strategy policies, customer database, etc.), design and development information, Intellectual Properties (IP) and/or the like.

However, while their private data may be located in one geographical regions, one or more of the users may be travelling and may therefore access the multi-region cloud service from one or more other geographical regions which are nit their associated geographical regions.

As described for the cloud service, the multi-region cloud service may be facilitated by a container execution system, in particular a distributed container execution system, for example, Kubernetes and/or the like distributed across the plurality of geographical regions to provide a multi-region orchestration platform for managing the containerized workloads, services and applications of the multi-region cloud service.

In such embodiments, one or more edge proxy servers and one or more application servers may be deployed independently in each of the plurality of geographical regions such that the edge proxy server(s) and the application server(s) in each geographical region may execute independent of the edge proxy server(s) and the application server(s) deployed in any of the other geographical regions. Intra-region communication within each region between the edge proxy server(s) and the applications server(s) deployed in the same region as well as inter-region communication between edge proxy servers deployed in different regions may be done using one or more communication means, networks and/or channels facilitated by the distributed container execution system, for example, routing tables, VPC networks, peering connections, Virtual Private Network (VPN) connections, tunnels and/or the like.

In order to support global access of users from any of the plurality of geographical regions to their private data which is exclusively and securely stored in their associated geographical regions, the multi-region cloud service may be configured and deployed to ensure privacy, security and/or safety of private data relating to each of the geographical regions according to the geographical segregation between the geographical regions.

Each of the edge proxy servers may be configured to analyze each request it receives from one or more of the client devices to identify and determine the target geographical region of each received request. In case the edge proxy server determines that the request targets the same geographical region in which the edge proxy server is deployed, the edge proxy server may transmit (forward) the request to one or more of the application server(s) deployed in the same geographical region. However, in case the edge proxy server determines that the request targets another geographical region, the edge proxy server may transmit (forward) the request to edge proxy servers deployed in the other (target) geographical region which may in turn transmit the request to one or more of the application server(s) deployed in the other geographical region.

Optionally, the authentication microservice executed by the edge proxy server and configured to authenticate each access request received at the edge proxy server may be further configured to analyze each access request and determine its target geographical region.

A login service may be also deployed to authenticate the users accessing the multi-region cloud service. While the login service may be deployed in one more specific geographical region, for example, the primary geographical region, a plurality of login service may be optionally deployed separately and independently in each of the plurality of geographical regions meaning that a respective login service may be executed by the edge proxy server(s) and/or the application server(s) deployed in each geographical region.

As described herein before, during each session established with each client device authenticated by the login service based on the credentials transmitted in the login request, the authentication microservice may authenticate each subsequent request by verifying the session token(s) included in the respective subsequent request. The authentication microservice may further determine the target geographical region of each subsequent request based on the geographical routing information extracted from the session token(s) and/or included in the respective subsequent request. The authentication microservice may then instruct forwarding and/or transmission of the respective subsequent request accordingly to the application server(s) deployed in the target geographical regions.

Using an authentication microservice for authenticating requests to access the cloud service may present major benefits and advantages compared to existing cloud service architectures.

First, the application(s) and/or service(s) of the existing cloud architectures which often be monolith applications may typically integrate authentication functionality of the access requests to the cloud service. This integrated approach may present major limitations, for example, complex update, deployment and/or rollback of the authentication module, limited scalability, difficult problem isolation to name just a few. In contrast, deploying the authentication microservice which is completely independent of any other functional module of the cloud service may overcome these limitations. Complexity of control of the authentication microservice, for example, design, update, deployment, maintenance and/or the like may be significantly reduced since the authentication microservice may include only logic relating to the authentication process and may be thus a coherent, focused and typically light weight function module which may be easily controlled. The independency between the authentication microservice and the application may enable easier, faster and/or more focused problem and/or failure isolation.

Moreover, while the monolith application may be heavy and very resource intensive which may be therefore not be very scalable, the authentication microservice may be highly scalable and resource efficient since instances, for example, containers (Dockers) of the authentication microservice may be dynamically deployed, instantiated and/or removed according to demand, i.e. according to the number of incoming requests to the cloud service. The authentication microservice may be therefore highly scalable on one hand to support varying and high requests volume while highly resources efficient since computing resources (e.g. processing resources, storage resources, networking resources, etc.) may be freed and reduced in case of low request volume.

The authentication microservice architecture may present further benefits and advantages for the multi-region cloud service. First, the multi-region cloud service may become highly robust and failure immune since by extracting the authentication microservice form the application(s) and/or service(s) of the multi-region cloud service, the authentication microservice may be deployed separately and independently in each of the geographical regions of the multi-region cloud service. Therefore, even while one or more of the servers may be unavailable, for example, down, failed, under cyberattack, in maintenance and/or the like in one or more of the geographical regions, including the primary geographical regions, the authentication microservice may be still fully available for users in other geographical regions. Deploying a separate and independent login service in each of the geographical regions may further ensure independency of the services offered by the multi-region cloud service in the different geographical regions.

Moreover, configuring the authentication microservice to further route each incoming request, specifically each subsequent request (following the login request), to its destination, i.e., to its target geographical region based on the geographical routing information extracted from the request may significantly reduce latency and/or resource consumption (utilization) for responding to the request. The additional effort required for further analyzing the geographical routing information extracted from each request may be very small and practically insignificant for the authentication microservice configured to receive and analyze each request in order to authenticate it. The additional time that maybe required for the authentication microservice to identify the target geographical region of each request may be therefore very low and practically insignificant compared to the time required for a different separate functional module to analyze each request and route it accordingly thus significantly reducing the latency and/or resource consumption.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer program code comprising computer readable program instructions embodied on a computer readable medium may be transmitted using any appropriate medium, including but not limited to wireless, wire line, optical fiber cable, RF, etc., or any suitable combination of the foregoing.

The computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The computer readable program instructions for carrying out operations of the present invention may be written in any combination of one or more programming languages, such as, for example, assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 is a schematic illustration of an exemplary cloud service configured to authenticate access requests using an independent authentication microservice, according to some embodiments of the present invention.

An exemplary cloud service 100 may be configured to provide one or more cloud based services, for example, Infrastructure as a Service (IaaS), Platform as a Service (PaaS), Software as a Service (SaaS), Function as a Service (FaaS) and/or the like to one or more users 112 using one or more respective client devices 110 to access the cloud service 100.

One or more edge proxy servers (frontend servers) 106 deployed at the edge of the cloud service 100 may be configured to provide and manage access to the cloud service 100, specifically to one or more application servers (backend servers) 108 configured to executing one or more applications, services, tools and/or utilities (collectively designated applications herein after) of the cloud service 100. The edge proxy server(s) 106 may be therefore configured to support one or more functions for managing the access requests, for example, ingress control, DNS, load balancing, reverse proxy and/or the like.

The user(s) 112 using respective client device(s) 110, for example, a server, a computer, a laptop, a mobile device (e.g., Smartphone, tablet, etc.), a wearable device (e.g., smart watch, goggles, etc.) and/or the like may access the cloud service 100 specifically the edge proxy server(s) 106 via a network 114 comprising one or more wired and/or wireless networks, for example, a Local Area Network (LAN), a Wireless LAN (WLAN), a Wide Area Network (WAN), a Municipal Area Network (MAN), a cellular network, the internet and/or the like.

Deployed at the edge of the cloud service 100, the edge proxy server(s) 106 connected to the network 114 may typically receive the access requests originating from the client devices 110.

Each edge proxy server 106 may comprise one or more processors arranged for parallel processing, as clusters and/or as one or more multi core processor(s) and a non-transitory storage medium for code and/or data store and one or more network interfaces for connecting to the network 114 and/or for communicating with the application server(s) 108. The storage may comprise one or more non-transitory memory devices, either persistent non-volatile devices (e.g. Hard Drive (HDD), Solid State Disk (SSD), etc.) and/or volatile devices (e.g. RAM, cache, etc.). The storage may further include one or more network storage resources, for example, a storage server, a Network Accessible Storage (NAS), a network drive, a cloud storage and/or the like accessible via the network interface(s) of the edge proxy server 106.

The edge proxy server 106 may be capable of executing one or more software modules such as, for example, a process, a script, an application, an agent, a utility, a tool, an Operating System (OS) and/or the like each comprising a plurality of program instructions executed by the processor(s) of the respective edge proxy server 106 from its storage (program store). The edge proxy server 106 may optionally further include, utilize and/or otherwise facilitate one or more hardware modules (elements) available in the edge proxy server 106, for example, a circuit, a component, an Integrated circuit (IC), an Application Specific Integrated Circuit (ASIC), a Field Programmable Gate Array (FPGA), a Digital Signals Processor (DSP), a Graphic Processing Unit (GPU), an Artificial Intelligence (AI) accelerator and/or the like.

Each edge proxy server 106 may therefore execute one or more functional modules utilized by one or more software modules, one or more of the hardware modules and/or a combination thereof, for example, an ingress controller, an edge stack and/or the like such as, for example, Envoy and/or the like for managing and directing access requests received from the client device(s) 110 to the application(s) provided by the application server(s) 108, for example, ingress control, DNS, load balancing, reverse proxy and/or the like. The edge proxy server 106 may further execute an authentication functional module, in particular an authentication microservice 120 configured to authenticate each access request before transmitting (forwarding) it to the application server(s) 108.

Similarly, each application server 108 may comprise one or more processors arranged for parallel processing, as clusters and/or as one or more multi core processor(s) and a non-transitory storage medium for code and/or data store and one or more network interfaces for communicating with the edge proxy server(s) 106 and/or with one or more other application servers 108. The storage may comprise one or more non-transitory memory devices, either persistent non-volatile devices and/or volatile devices. The storage may further include one or more network storage resources, for example, a storage server, a NAS, a network drive, a cloud storage and/or the like accessible via the network interface(s) of the application server 108.

Each application server 108 may be capable of executing one or more software modules such as, for example, a process, a script, an application, an agent, a utility, a tool, an OS and/or the like each comprising a plurality of program instructions executed by the processor(s) of the application server 108 from its storage (program store). One or more of the application servers 108 may optionally further include, utilize and/or otherwise facilitate one or more hardware modules (elements) available in the respective edge proxy server 106, for example, a circuit, a component, an IC, an ASIC, a FPGA, a DSP, a GPU, an AI accelerator and/or the like.

The application server 108 may therefore execute one or more functional modules utilized by one or more software modules, one or more of the hardware modules and/or a combination thereof, for example, for executing one or more of the applications, service(s) and/or datacenter(s) provided by the cloud service 100.

While the edge proxy server(s) 106 and the application server(s) 108 may be executed by physical machines and hardware processors, the edge proxy server(s) 106 and/or the application server(s) 108 may be typically implemented using virtualization technology, for example, virtual Machines (VM) instantiated over physical hardware.

Moreover, the edge proxy servers 106 and the application servers 108 may be deployed and executed as containers (e.g. Dockers, etc.) in a container execution system 102 deployed to facilitate the cloud service 100. The container execution system 102, for example, Kubernetes and/or the like may be configured to provide an orchestration environment and platform for managing containerized workloads, services and applications, for example, the ingress controller, edge stack module, the authentication microservice 120 and/or the like executed by the edge proxy server(s) 106 and/or the application(s) of the cloud service 100 executed by the application server(s) 108.

Optionally, the cloud service 100 may be utilized and/or deployed using one or more Virtual Private Clouds (VPC) facilitated and/or provided by one or more cloud platforms, infrastructures and/or services, such as, for example, Amazon Web Service (AWS), Google Cloud, IBM Cloud, Microsoft Azure and/or the like.

The edge proxy server(s) 106 may be communicatively coupled to the application server(s) 108 via one or more intra-region networking infrastructures which may comprise one or more physical networks and/or one or more VPC networks facilitated by the container execution system 102. The communication between the edge proxy server(s) 106 and the application server(s) 108 may be also based on routing tables defined for the VPC(s).

A login service 122 deployed in the cloud service 100 may be configured to authenticate the user(s) 112 and/or their respective client device(s) 110 before granting them access to the application(s) (services) of the cloud service 100. The login service 122 may be configured to authenticate the user(s) 112 and/or their respective client device(s) 110 based on credentials extracted from one or more login requests received from each client device 110 requesting to establish a session with the cloud service 100, specifically with one or more of the application(s) provided by the cloud service 100.

The login service 122 may verify the extracted credentials compared to valid credentials stored in one or more account records maintained for the cloud service 100, for example, a database, a file, a table, a list and/or the like storing at least part of account information of a plurality of accounts of the users 112 and/or client devices 110 authorized to access the cloud service 100.

The account information may include at least the credentials of all the authorized users 112 and/or client devices 110, for example, names, user names, passwords, codes, keys and/or the like. However, the account information may further include additional information relating to the user 112 and/or to the respective client device 110 he uses, for example, geographical routing information indicative of a geographical region associated with the target the user 112 and/or the respective client device 110, for example, a geographical region where the user 112 lives, a geographical region where the user 112 works, a geographical region where a company in which the user 112 works is located and/or the like. The geographical routing information may therefore include, for example, a name of a geographical region, residence details (e.g. address, etc.), work location details and/or the like.

The login service 122 may be implemented according to one or more architectures, deployments, and/or design practices. For example, the login service 122 may be integrated in the application provided by the cloud service 100 which is executed by the application service(s) 108. This means that the login service 122 may be part of the application monolith executed by the application service(s) 108. In another example, the login service 122 may be implemented as a microservice deployed and executed separately and independently of the application monolith. In such case, the login service 122 microservice may be executed as a container in the container execution system 102 by the edge proxy servers 106 or by the application servers 108.

Figure 2:
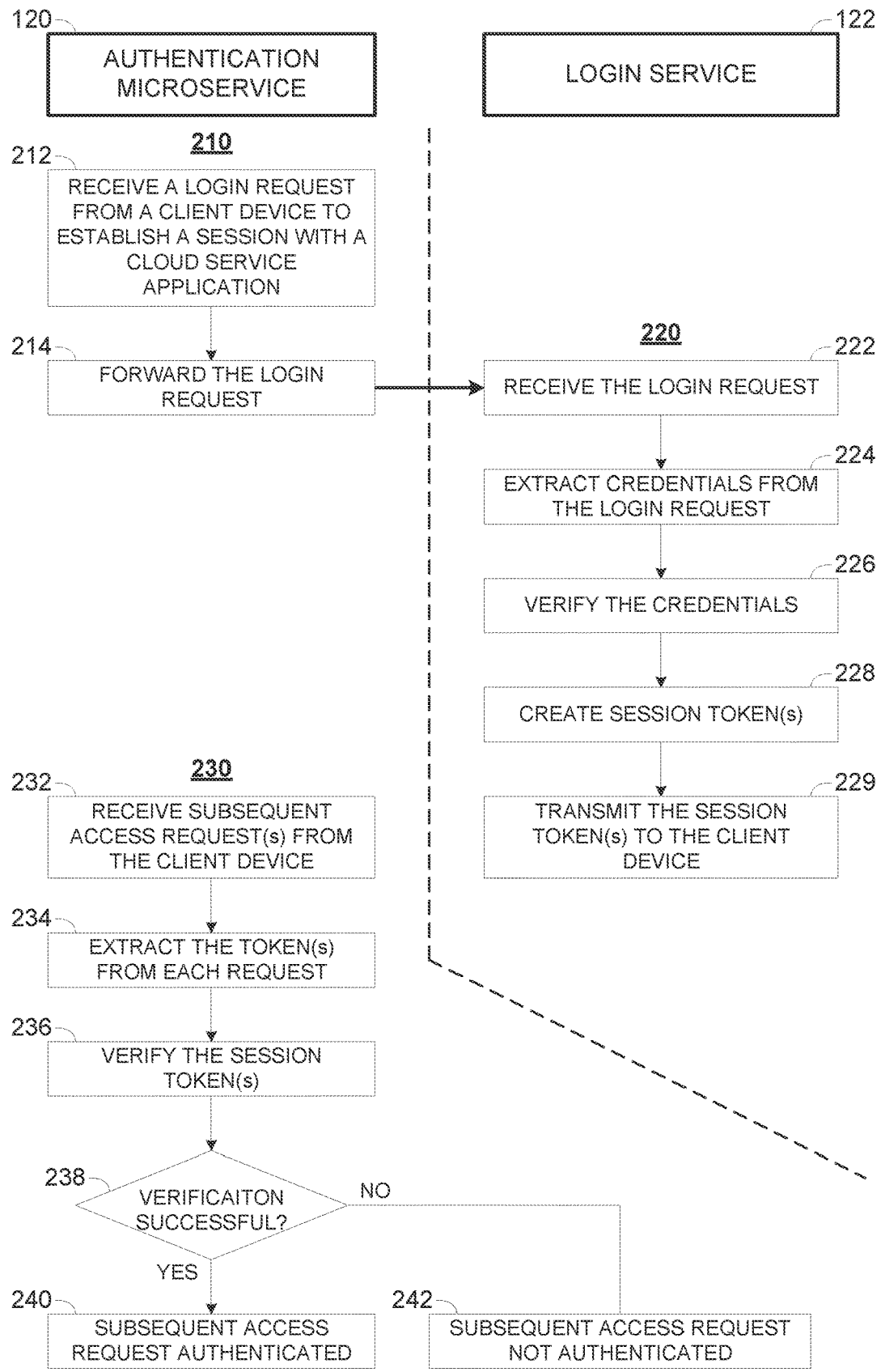
FIG. 2 is a flowchart of exemplary processes of authenticating requests to access a cloud service using an independent authentication microservice, according to some embodiments of the present invention.

Reference is now made to FIG. 2, which is a flowchart of exemplary processes of authenticating requests to access a cloud service using an independent authentication microservice, according to some embodiments of the present invention.

An exemplary process 210 may be executed by an authentication microservice such as the authentication microservice 120 executed by one or more edge proxy servers such as the edge proxy server for forwarding one or more login requests originating from one or more client devices such as the client device 110 used by one or more respective users such as the user 112 to access and establish sessions with one or more applications (services) executed by one or more application servers such as the application server 108 of a cloud service such as the cloud service 100.

An exemplary process 220 may be executed by a login service such as the login service 122 for verifying credentials of the respective user 210 included in the login request and generate one or more session token which may be inserted by the respective client device 110 into one or more subsequent requests following the login request and pertaining to the same session.

An exemplary process 230 may be executed by the authentication microservice 120 to authenticate each subsequent requests based on verification of the session token(s) extracted from the request and output an authentication notification accordingly.

For brevity, the exemplary processes 210, 220 and 230 are described for using a single authentication microservice 120 executed by a single edge proxy server 106 for authenticating access requests originating from a single client device 110 used by a single respective user 112 and pertaining to a single session established with a single application (service) executed by a single application server 108 of the cloud service 100. This, however, should not be construed as limiting, since, as may be apparent to a person skilled in the art, the processes 210, 220 and 230 may be easily replicated and scaled to a plurality of authentication microservices 120 executed by a plurality of edge proxy servers 106 for authenticate access requests pertaining to a plurality of sessions established by a plurality of client devices 110 used by a plurality of respective users 112 with a plurality of applications executed by a plurality of application servers 108 of the cloud service 100.

As shown at 212, the process 210 starts with the authentication microservice 120 receiving a login request from a client device 110 used by a respective user 112 to access and establish a session with an application executed by one or more of the application server(s) 108 of the cloud service 100.

The login request may include credentials of the user 112 and/or of the client device 110, for example, a name, a user name, a password, a code, a key and/or the like uniquely assigned to the user 112 and/or of the client device 110 accessing the application (service) of the cloud service 100. The credentials may be therefore used to deterministically identify the user 112 and/or the client device 110 accessing the application of the cloud service 100 and verify they are valid and/or legitimate users authorized to access the application.

The authentication microservice 120 may analyze the login request and may determine that the request is a login request based on one or more attributes of the login request as known in the art, for example, a structure, a value of one or more fields of the request, content of a payload of the request and/or the like.

As shown at 214, after determined to be a login request, the authentication microservice 120 may forward the login request to the login service 122 which may be executed by the edge proxy server 106, by the application server 108 and/or by a combination thereof.

As shown at 222, the process 200 starts with the login service 122 receiving the login request, for example, from the authentication microservice 120.

As shown at 224, the login service 122 may extract the credentials from the login request.

As shown at 226, the login service 122 may verify the credentials to verify the at the user 112 and/or the client device 110 are legitimate and/or valid users who authorized to access the application.

As described herein before, the login service 122 may access one or more of the account records storing the credentials of all users 112 and/or client devices 110 authorized to access the cloud service 100 and establish a session with the application executed by the application server 108 of the cloud service 100. The login service 122 may retrieve the credentials of the user 112 and/or client device 110 stored in the account record(s) and verify the credentials extracted from the login request compared to the credentials stored in the account record(s).

As shown at 228, assuming that the credentials are successfully verified meaning that the user 112 and/or the client device 110 are successfully authenticated to be who they claim to be, the login service 122 may create one or more session tokens for the (current) session established by the client device 110 with the application executed by the application server 108.

Typically, the login service 122 may create session token(s) per session such that each session token may be associated with a receptive session. However, one or more of session token(s) may be optionally used during one or more future sessions established between the client device 110 and the application(s) executed by the application server(s) 108.

As shown at 229, the login service 122 may transmit the session token(s) back to the client device 110 which may use the session token(s) in one or more subsequent requests initiated during the (current) session to access the application executed by the application server 108.

The login service 122 may apply one or more methods, techniques and/or algorithms as known in the art for creating the session token(s) and providing it to the client device 110. For example, one or more of the session tokens created by the login service 122 may comprise a JSON Web Token (JWT) which may be transmitted back to the client device 110 and embedded, for example, as a cookie in a browsing application, for example, Chrome, Firefox, Opera, Edge and/or the like executed by the client device 110 for accessing the cloud service 110, specifically for accessing the application. In another example, one or more of the session tokens created by the login service 122 may be transmitted to the client device 110 and used by one or more proprietary agents, tools, mobile applications and/or the like (collectively designated proprietary agent) executed by the client device 110 for accessing the cloud service 110. The proprietary agent configured to transmit requests to access the cloud service 100 may be further configured to include one or more of the session token(s) and/or part thereof in each of the access requests.

The login service 122 may optionally include additional information relating to the user 112 and/or to the respective client device 110 in one or more of the session token(s), for example, the geographical routing information indicative of the geographical region associated with the target user 112 and/or to the respective client device 110. The login service 122 may retrieve the geographical routing information from the account record(s) storing the at least part of the account information of the plurality of accounts of the authorized users 112 and/or client devices 110 and include it in one or more of the session token(s).

The login service 122 may further include in one or more of the session token(s), the geographical routing information relating to the user 112 and/or to the client device 110. The geographical routing information may indicate a target geographical region associated with the user 112, for example, the geographical region where the user 112 lives, the geographical region where the user 112 works, geographical region where a company in which the user 112 works is located and/or the like.

Typically, the login service 122 may create a signature, specifically a cryptographic signature for one or more of the session token(s) created for the session, for example, the JWT. The signature of the session token may be later used for verifying that the session token is a valid token, verifying the creator of the session token and/or verifying that the session token has not been tampered. The login service 122 may apply one or more cryptographic methods, techniques and/or algorithms for creating the session token signature, for example, symmetric key encryption, asymmetric key encryption and/or the like.

For example, the login service 122 may apply one or more symmetric cryptographic algorithms, for example, HS256 and/or the like to create the signature of one or more of the session token(s) using a shared key. One or more parties having the same shared key may later apply the appropriate symmetric cryptographic algorithms, for example, HS256 using the shared key to decrypt the signature of the session token created by the logic service 122 thus verifying the session token. In another example, the login service 122 may apply one or more asymmetric cryptographic algorithms, for example, RS256 and/or the like to create the signature of one or more of the session token(s) using a private key which is kept secret known only to the login service 122. One or more parties having a public key which is derived from the private key used by the login service 122 and publicly distributed may later apply the appropriate symmetric cryptographic algorithms, for example, HS256 using the public key to decrypt the signature of the session token created by the logic service 122 thus verifying the session token.

The client device 110 may embed one or more of the session token(s) and/or part thereof in each subsequent request transmitted, following the login request, during the (current) session for accessing the application executed by the application server(s) 108 of the cloud service 100. This means that each subsequent request pertaining to the (current) session may include at least part of one or more of one or more of the session token(s) created by the login service 122 for the (current) session.

As shown at 232, the process 230 starts with the authentication microservice 120 receiving one or more subsequent (access) requests originating from the client device 110 which may pertain to the (current) session established with the application server(s) 108 for accessing the application(s).

As shown at 234, the authentication microservice 120 may extract one or more of the session token(s) embedded and/or included in each subsequent request. For example, assuming the logic service 122 created a JWT for the client device 110 which may embed and/or include the JWT in each subsequent request for accessing the cloud service 100, the authentication microservice 120 may extract the JWT from each subsequent request.

As shown at 236, the authentication microservice 120 may authenticate each subsequent request by verifying one or more of the session token(s) extracted from the respective subsequent request.

In particular, the authentication microservice 120 may verify the session token(s) by attempting to decrypt the signature of the session token(s) using one or more of the cryptographic algorithms, specifically the cryptographic algorithms used by the login service 122 coupled with the appropriate cryptographic key. For example, assuming the login service 122 created the signature of the session token(s) by applying a symmetric cryptographic algorithm, for example, HS256 using a certain shared key. In such case, the authentication microservice 120 may have access to the certain shared key which may be, for example, retrieved from one or more records stored at the edge proxy server 106. The authentication microservice 120 may therefore apply the symmetric cryptographic algorithm, for example, HS256 using the certain shared key to decrypt and verify the signature of the session token(s). In another example, assuming the login service 122 created the signature of the session token(s) by applying an asymmetric cryptographic algorithm, for example, RS256 using a certain private key. In such case, the authentication microservice 120 may have access to a public key derived from the certain private key which may be for example, stored at the edge proxy server 106. The authentication microservice 120 may therefore apply the asymmetric cryptographic algorithm, for example, RS256 using the public key to decrypt and verify the signature of the session token(s).

As shown at 238, which is a conditional step, in case the authentication microservice 120 successfully verifies the session token(s), the process 230 may branch to 240. Otherwise, in cased the authentication microservice 120 fails to verify session token(s), the process 230 may branch to 242.

As shown at 240, since the authentication microservice 120 successfully verified the session token(s) extracted from the respective subsequent request, the authentication microservice 120 may determine that the respective subsequent request is a valid request originating from a valid client device 110 which was successfully authenticated by the logic service 122 and pertaining the same session established between the client device 110 and the cloud service 100. The authentication microservice 120 may therefore authenticate the respective subsequent request.

However, as shown at 242, since the authentication microservice 120 failed to verify the session token(s) extracted from the respective subsequent request, the authentication microservice 120 may determine that the respective subsequent request may be invalid and accordingly the authentication microservice 120 may not authenticate the respective subsequent request.

Optionally, the authentication microservice 120 may be further configured to enrich one or more of the subsequent requests originating from the client device 110, specially successfully authenticated subsequent requests. The authentication microservice 120 may enrich the subsequent request(s) by inserting (embedding) one or more additional data items in the respective subsequent request, for example, information relating to the user 112 and/or to the client device 110 which may be extracted from one or more of the session token(s) extracted from the respective subsequent request.

As described herein before, the information included in the session token(s) by the login service 122 may include at least the geographical routing information relating to a geographical region associated with the user 112 and/or to the client device 110. The authentication microservice 120 may therefore extract the geographical routing information from the session token(s) and enrich one or more of the subsequent requests to include and to the target geographical region of the user 112.

The edge proxy server 106, optionally the authentication microservice 120 itself, may take and/or initiate one or more actions based on outcome of the verification process of each subsequent request. For example, in case of successful authentication of the receptive subsequent request by the authentication microservice 120, the edge proxy server 106 may forward, for example, transmit, deliver, send and/or otherwise provide the receptive subsequent request to the application server(s) 108 executing the application with which the session is established with the client device 110. In another example, in case the authentication microservice 120 fails to authenticate the receptive subsequent request, the edge proxy server 106 may block the receptive subsequent request, initiate one or more an alerts and/or notifications, forward the receptive subsequent request to a dedicated server and/or service, for example, a spam service, a quarantine, and/or the like.

According to some embodiments of the present invention, the cloud service 100 may be a multi-region cloud service deployed to provide region based applications (services) to a plurality of users 112 using respective client device 110 who are located in a plurality of geographical regions. The geographical regions may be divided according to one or more division paradigms, for example, geography, law and/or regulation enforcement, politics, economics, finance division, culture and/or the like, for example, north America, south America, western Europe, eastern Europe, north Africa, middle east, southeast Asia, Australia and/or the like.

Figure 3:
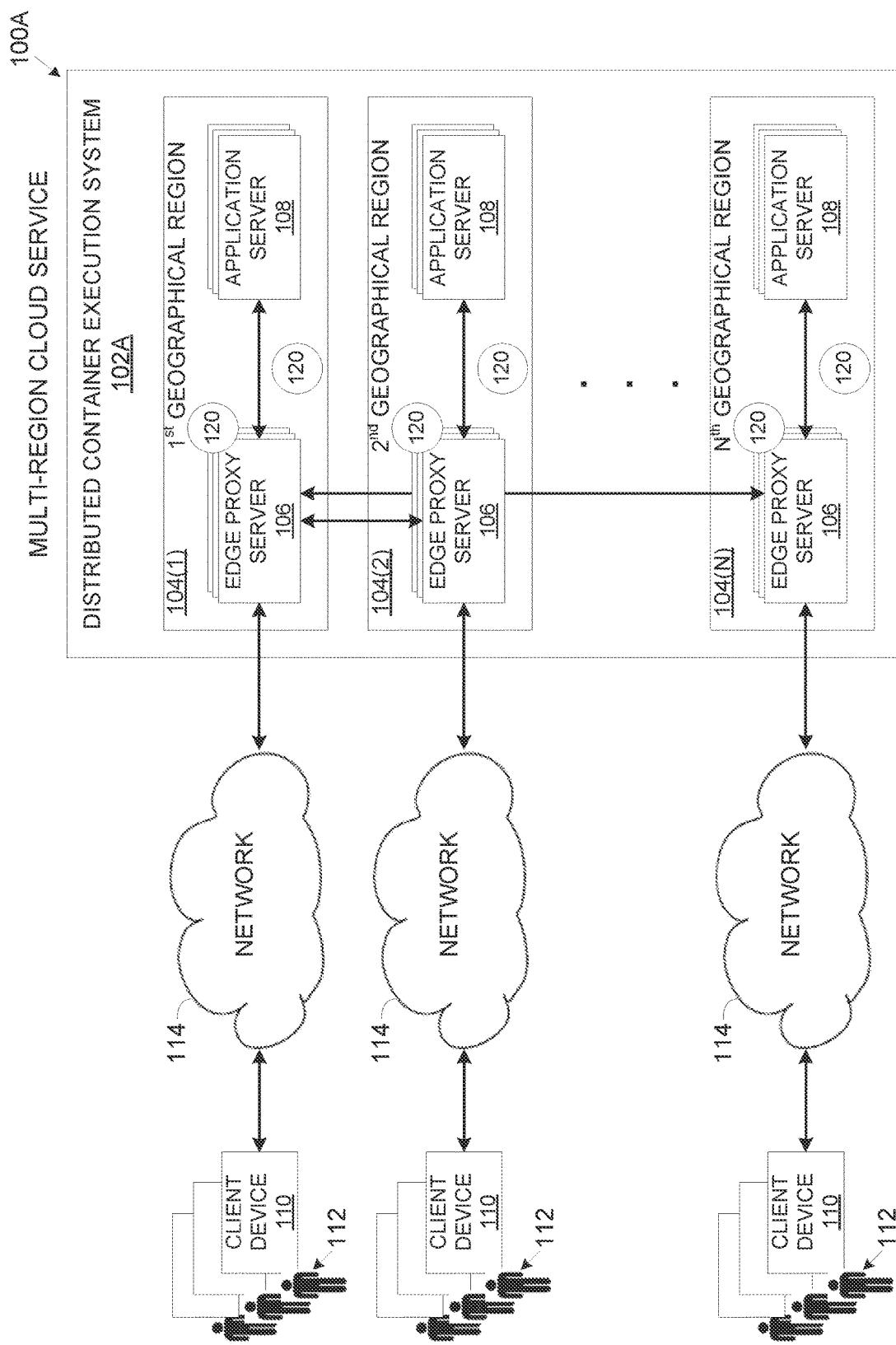
FIG. 3 is a schematic illustration of an exemplary multi-region cloud service configured to authenticate access requests using an independent authentication microservice, according to some embodiments of the present invention.

Reference is now made to FIG. 3, which is a schematic illustration of an exemplary multi-region cloud service configured to authenticate access requests using an independent authentication microservice, according to some embodiments of the present invention.

An exemplary multi-region cloud service 100A which is an extension of the cloud service 100 may be configured to provide one or more of the cloud based services, for example, IaaS, PaaS, SaaS, FaaS and/or the like may be deployed to provide region based services in a plurality of geographical regions 104, for example, a $1^{st}$ geographical region 104(1), a $2^{nd}$ geographical region 104(2) and so on to a $N^{th}$ geographical region 104(N).

The plurality of geographical regions 104 may optionally comprise a primary geographical region, for example, the $1^{st}$ geographical region 104(1) and one or more secondary regions, for example, the $2^{nd}$ geographical region 104(2) to the N, geographical region 104(N).

A plurality of edge proxy servers such as the edge proxy server 106 deployed at the edge of the multi-region cloud service 100A in the plurality of geographical regions 104 may be configured to provide and manage access to the multi-region cloud service 100A, specifically to one or more of a plurality of application servers such as the application server 108.

The plurality of application servers 108 deployed in the plurality of geographical regions 104 of the multi-region cloud service 100 may be configured to provide the actual application(s) (service(s)) offered by the multi-region cloud service 100.

The edge proxy servers 106 and the application servers 108 deployed in each of the geographical regions 104 may be completely independent of the edge proxy servers 106 and the application servers 108 deployed in any of the other geographical regions 104 such that failures, downtime and/or the like experienced in one geographical region 104 may not affect edge proxy servers 106 and/or application servers 108 deployed in other geographical regions 104.

Since each edge proxy server 106 may be deployed at the edge of the multi-region cloud service 100A in one of the plurality of geographical region 104, the respective edge proxy server 106 connected to the network 114 of the respective geographical region 104 may typically receive access requests originating from client devices 110 located in the respective geographical region 104.

As described for the cloud service 100, the multi-region cloud service 100A may be facilitated by a container execution system such as the container execution system 102 in particular, a distributed container execution system 102A distributed across the plurality of geographical regions 104. The distributed container execution system 102A, for example, Kubernetes and/or the like may be configured to provide a multi-region orchestration environment and platform for managing containerized workloads, services and applications executed to support the multi-region cloud service 100A.

As described herein before, the edge proxy servers 106 and the application servers 108 may be therefore deployed and executed as containers (e.g. Dockers, etc.) in the distributed container execution system 102A deployed across the plurality of geographical regions 104.

Moreover, as described for the cloud service 100, the multi-region cloud service 100A may be deployed using a plurality of VPCs facilitated and/or provided by one or more cloud infrastructures and/or services, such as, for example, AWS, Google Cloud, IBM Cloud, Microsoft Azure and/or the like. For example, one or more VPCs may be deployed in each of the geographical regions 104 such that the VPC(s) deployed in each geographical region 104 is isolated and independent of the VPCs deployed in all other geographical regions 104.

Each of the edge proxy servers 106 may execute an authentication microservice such as the authentication microservice 120 for authenticating each access request received at the edge proxy server 106 before transmitting (forwarding) it to the application server(s) 108.

Moreover, a login service such as the login service 122 may be deployed in each of the geographical regions 104 to authenticate the user(s) 112 and/or their respective client device(s) 110 before granting them access to the application(s) (services) of the multi-region cloud service 100A.

Each of the edge proxy servers 106 may be communicatively coupled to one or more application servers 108 deployed in the same geographical region 104 via one or more intra-region networking infrastructures such that the proxy server(s) 106 and the application server(s) 108 deployed in the same geographical region 104 may communicate with each other. While they may comprise one or more physical networks, the intra-region networking infra-structure(s) may be typically based on one or more VPC networks facilitated by the distributed container execution system 102. Communication between edge proxy servers 106 and application servers 108 deployed in the same geographical region 104 may be also based on routing tables defined for the respective geographical region 104, for example, for the VPC(s) deployed in the respective geographical region 104.

Moreover, each of the edge proxy servers 106 may be communicatively coupled to one or more other edge proxy servers 106 deployed in one or more other (different) geographical regions 104 via one or more inter-region networking infrastructures such that each proxy server 106 may communicate with edge proxy server(s) 106 deployed in one or more of the other geographical regions 104. While they may comprise one or more physical networks, the inter-region networking infrastructure(s) may be typically based on one or more peering connections, tunnels, Virtual Private Network (VPN) connections and/or the like facilitated by the distributed container execution system 102. For example, in case the distributed container execution system 102A is deployed using AWS, one or more AWS transit gateways may be used to connect between edge proxy server(s) 106 deployed in different geographical regions 104.

The multi-region cloud service 100A may be configured to ensure privacy, security and/or safety of private data relating to each of the geographical regions 104, for example, data relating to users such as the users 112 having accounts registered and maintained in each geographical region 104 such as, for example personal information, medical information, sensitive information, corporate information and/or the like.

To this end, the multi-region cloud service 100A optionally facilitated by the distributed container execution system 102A may be configured to restrict private data based on the geographical segregation between the geographical regions 104. As such, while global data excluding private data may be shared between different geographical regions, private data relating to each geographical region 104 may not be shared, distributed, exchanged, transmitted, replicated, exposed and/or otherwise exported from the respective geographical region 104.

Moreover, while each of the users 112 may be associated with a specific one of the geographical regions 104 as described herein before, one or more of the users 112 may travel out of their associated geographical region 1-04 to one or more other geographical regions 104.

Therefore, in order to enable users 112 to access their private data regardless of their current geographical location while preventing sharing of private data between different geographical regions 104, each edge proxy server 106 may be configured to manage and route access request received from one or more of the client devices 110 used by respective users 112 to their associated geographical regions 104.

In particular, each edge proxy server 106 may manage and route each subsequent request (flowing a respective login request) received from one of the client devices 110 to its target geographical region 104 after first authenticated by an instance of the authentication microservice 120 executed by the respective edge proxy server 106. The edge proxy server 106 may route each subsequent request based on the geographical routing information extracted from the respective subsequent request.

Optionally, in addition to authenticating each subsequent request received at the receptive edge proxy server 106, the authentication microservice 120 itself may be further configured to manage and route each access subsequent request to its target geographical region 104 based on the geographical routing information.

Figure 4:
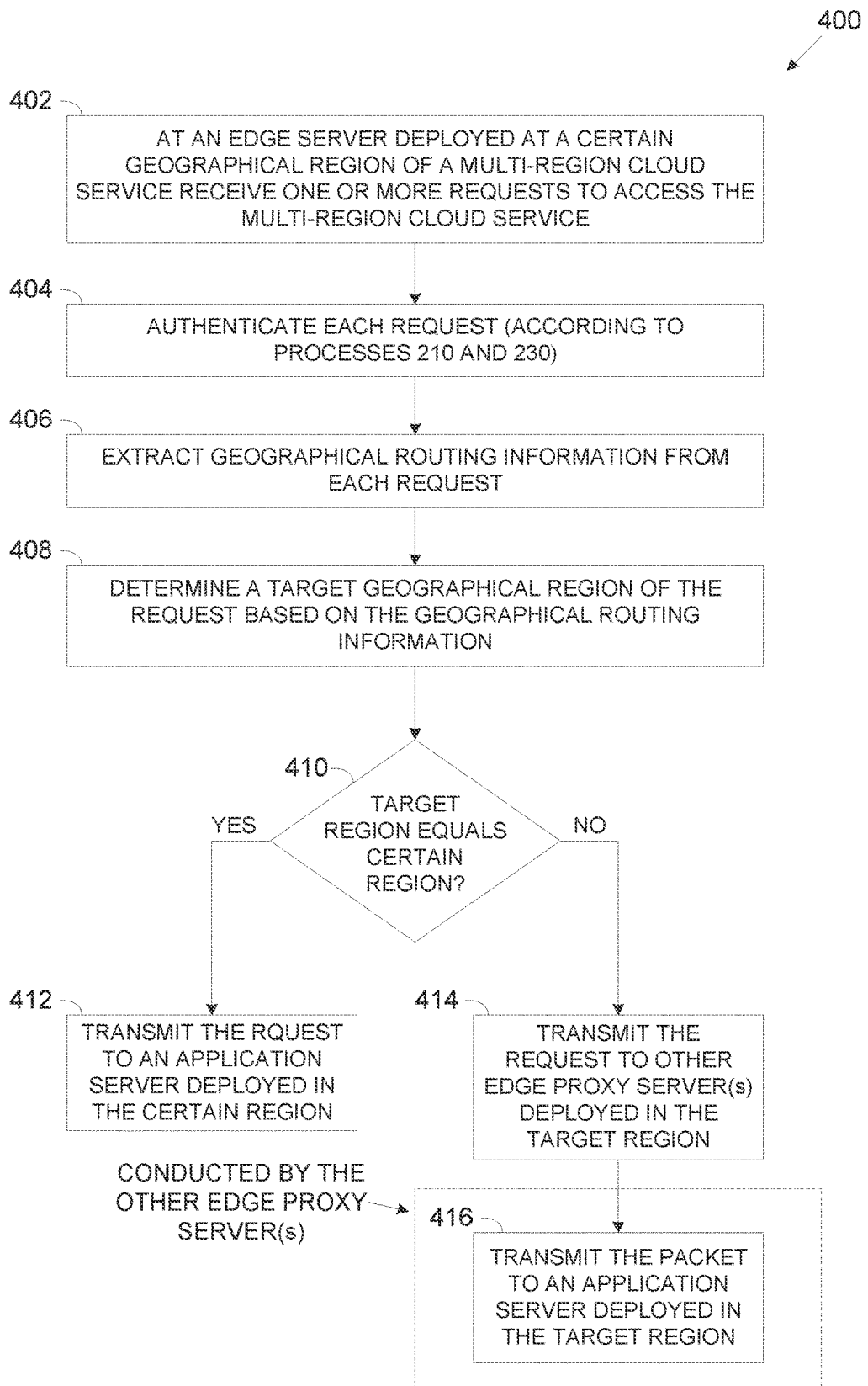
FIG. 4 is a flowchart of exemplary of authenticating and routing a request received from a user to access a multi-region cloud service to its target geographical region, according to some embodiments of the present invention.

Reference is now made to FIG. 4, which is a schematic illustration of authenticating and routing a request received from a user to access a multi-region cloud service to its target geographical region, according to some embodiments of the present invention.

An exemplary process 400 may be executed by one or more edge proxy servers such as the edge proxy servers 106 deployed in a plurality of geographical regions such as the geographical regions 104 of a multi-region cloud service such as the multi-region cloud service 100A optionally facilitated by a distributed container execution system such as the distributed container execution system 102A, for example, Kubernetes.

Figure 5:
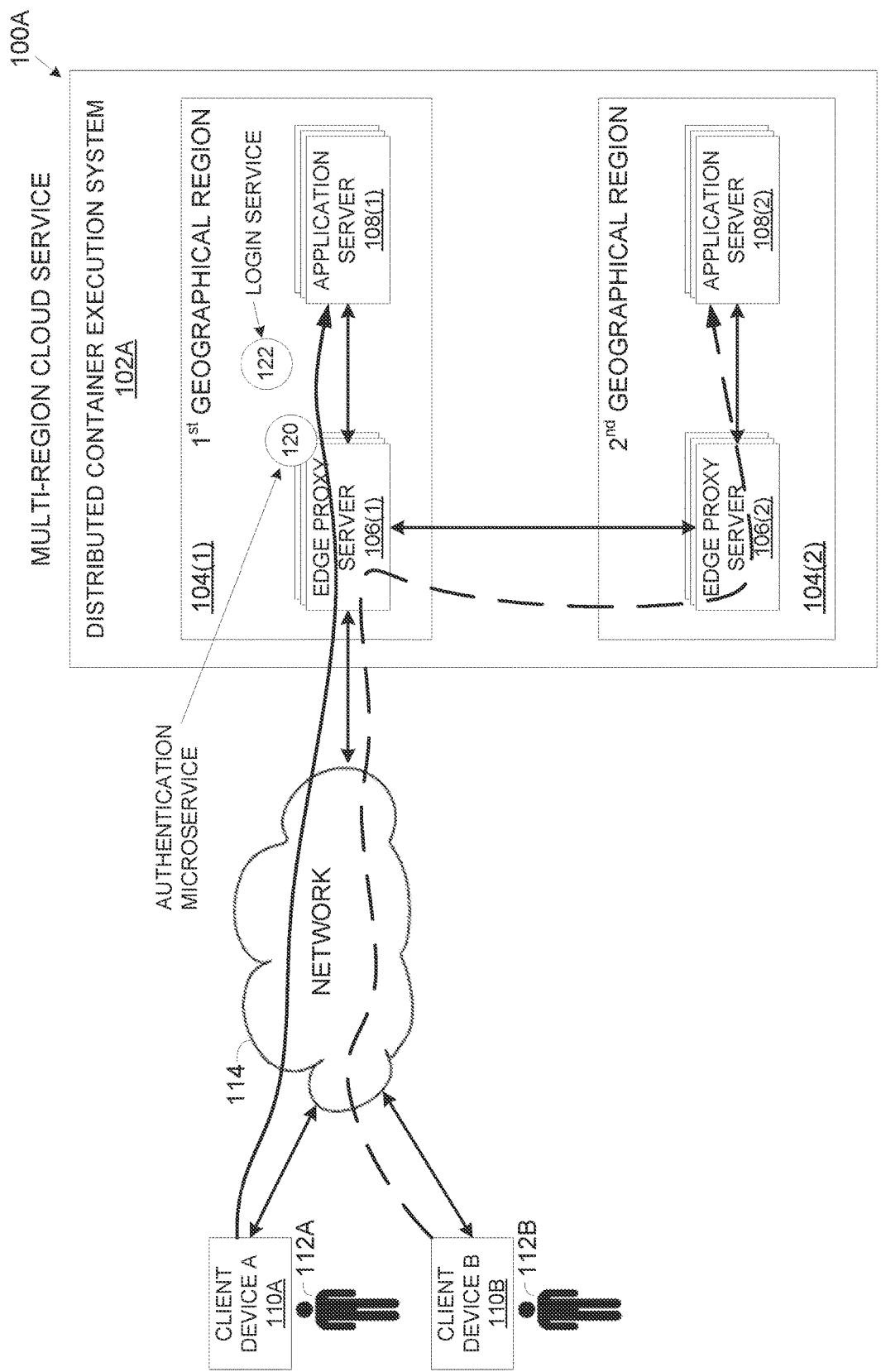
FIG. 5 is a schematic illustration of an exemplary system for authenticating and routing a request received from a user to access a multi-region cloud service to its target geographical region, according to some embodiments of the present invention.

Reference is also made to FIG. 5, which is a schematic illustration of an exemplary system for authenticating and routing a request received from a user to access a multi-region cloud service to its target geographical region, according to some embodiments of the present invention.

The exemplary process 400 which is further illustrated visually in FIG. 5 is described for authenticating, managing and routing requests received at a certain one of the plurality of edge proxy servers 106 deployed in a certain geographical region 104 of the multi-region cloud service 100A facilitated by the distributed container execution system 102A, for example, Kubernetes distributed over a plurality of geographical regions such as the geographical regions 104. This, however, should not be construed as limiting, since, as may become apparent to a person skilled in the art, the process 400 may be replicated by the edge proxy server 106 deployed in the certain geographical region 104 to authenticate, manage and route requests received at the edge proxy server 106 from a plurality of client devices 110 such as the client devices 110 used by a plurality of respective users such as the users 112 located in the certain geographical region 104. Moreover, the process 400 may be further scaled and duplicated by a plurality of edge proxy servers 106 deployed in a plurality of geographical regions 104 to authenticate, manage and route a plurality of requests received at the plurality of edge proxy servers 106 from a plurality of client devices 110 used by a plurality of respective uses 112 located in the plurality of geographical regions 104.

Also, for brevity, the certain edge proxy server 106 is described to execute the process 600 while in practice the process 600 may be actually executed by one or more functional modules executed by the certain edge proxy server 106 which may be based on one or more software modules, hardware modules and/or a combination thereof.

Moreover, as described herein before, an authentication microservice such as the authentication microservice 120 executed by the edge proxy server 106 may optionally execute at least part of the process 400, for example, one or more of steps 406-414. However, for brevity, while step 404 which is explicitly executed by the authentication microservice 120, all other steps of the process 400 which may be optionally executed by the authentication microservice 120, are described to be executed by the edge proxy server 106.

As shown at 402, the process 400 starts with the certain edge proxy server 106 deployed in the certain geographical region 104 receiving a request originating from one of a plurality of client devices 110 used by a respective one of a plurality of users 112 to access a service provided by the multi-region cloud service 100A, specifically to access the distributed container execution system 102A, for example, Kubernetes.

The request originating from the client device 110 may be transmitted to the edge proxy server 106 via one or more wired and/or wireless networks of the network 114 and may be routed via one or more network equipment devices configured to route data packets as known in the art, for example, a gateway, a router, a switch, a proxy server, a reverse proxy server and/or the like.

Since it is deployed at the edge of the multi-region cloud service 100A in the certain geographical region 104, the certain edge proxy server 106 connected to the network 114 of the certain geographical region 104 may typically receive requests originating from client devices 110 located in the same certain geographical region 104, i.e., in the certain geographical region 104.

As shown at 404, the edge proxy server 106, specifically the authentication microservice 120 executed by the edge proxy server 106 may authenticate each request received at the edge proxy server.

In case the received request is a login request transmitted by the client device 110 to establish a session with the application (service) of the multi-region cloud service 100A, the authentication microservice 120 may execute the process 210 and forward the login request to a login service such as the login service 122 configured to execute the process 220 to authenticate the client deice 110 and/or the respective user 112 based on the credentials extracted from the login request and create one or more session tokens transmitted to the originating client device 110.

The authentication microservice 120 may further execute the process 230 for authenticating each subsequent request received from the originating client device 110 and pertaining to the same session established by the client device 110 with the multi-region cloud service 100A.

As shown at 406, the edge proxy server 106 may extract geographical routing information from each subsequent request pertaining to the same session.

The geographical routing information may include, for example, the geographical routing information included by the authenticating microservice 120 in each subsequent request to enrich it. As described herein before, the authenticating microservice 120 may extract the geographical routing information indicative of the target geographical region 104 associated with the user 112 and/or with the client device 110 from the session token(s) included in the receptive subsequent request. In another example, the geographical routing information may be indicated by an identifier (ID) included in each subsequent request which may uniquely identifying the originating client device 110 used by the user 112, for example, a serial number, a Media Access Controller (MAC) address and/or the like.

As shown at 408, the edge proxy server 106 may determine the target geographical region 104 of each subsequent request based on the geographical routing information included in the respective subsequent request.

For example, assuming the respective subsequent request is enriched by the authenticating microservice 120 to include the geographical routing information, the edge proxy server 106 may determine the target geographical region 104 of the respective subsequent request based on the geographical routing information embedded (included) in the respective subsequent request. In another example, assuming the geographical routing information includes the ID uniquely identifying the originating client device 110 used by the user 112, the edge proxy server 106 may be configured to extract the ID of the client device 110 from the respective subsequent request and determine the target geographical region 104 of the respective subsequent request based on one or more log records, for example, a database, a table, a list, a file and/or the like associating between IDs of one or more of the client devices 110 and respective target geographical regions 104.

As shown at 410, which is a conditional step, in case the target geographical region 104 of the respective subsequent request is the certain geographical region 104 in which the certain edge proxy server 106 is deployed, the process 400 may branch to 412. However, in case the target geographical region 104 of the respective subsequent request is not (i.e. different from) the certain geographical region 104 in which the certain edge proxy server 106 is deployed, the process 400 may branch to 414.

As shown at 412, since the target geographical region 104 of the respective subsequent request is the certain geographical region 104, the edge proxy server 106 may transmit (forward) the respective subsequent request to one or more of the application (backend) server(s) 108 deployed in the certain geographical region 104.

The edge proxy server 106 may transmit the request to the application server(s) 108 via one or more of the cloud intra-region networks facilitated by the distributed container execution system 102, for example, a VPC network configured to connect and support communication within the certain geographical region 104.

As shown at 414, since the target geographical region 104 of the respective subsequent request is not the certain geographical region 104, the edge proxy server 106 may transmit (forward) the received request to one or more other edge proxy servers 106 deployed in the target geographical region 104.

The edge proxy server 106 may transmit the request to the other edge proxy server(s) 106 via one or more of the cloud inter-region networks and/or channels facilitated by the distributed container execution system 102, for example, a peering connection, a tunnel, a VPN connection and/or the one or more of the VPC network(s) deployed to support communication within the certain geographical region 104.

The edge proxy server 106 may be configured to determine a destination for transmitting the subsequent requests based on one or more routing rules. Using the routing rules may apply for both transmitting requests to application server(s) 108 deployed in the same geographical region 104 and to requests transmitted to edge proxy server(s) 106 deployed in other geographical regions 104. The routing rules may be based on predefined fixed settings, dynamic settings and/or a combination thereof.

For example, a certain routing rule may define that the edge proxy server 106 may transmit each subsequent request targeting the certain geographical region 104 to a certain predefined application server 108 deployed in the certain geographical region 104. In another example, a certain routing rule may define that the edge proxy server 106 should apply load balancing and transmit subsequent requests targeting the certain geographical region 104 to one of a plurality of application servers 108 which are least loaded by other requests. In another example, a certain routing rule may define that the edge proxy server 106 may transmit requests directed to a target geographical region 104 different (other) from the certain geographical region 104 to one of a plurality of proxy edge servers 106 deployed in the target geographical region 104 according to one or more attributes of each request, for example, a type of target service, a type of requested data, part of a group of requests and/or the like. In another example, a certain routing rule may define priorities for at least some requests. In such case, the proxy edge server 106 may transmit received requests according to their priority.

As shown at 416, which is executed by the other edge proxy server 106 deployed in the target geographical region 104 of the request, the other edge proxy server 106 may execute at least part of the process 400 to analyze the received request and identify the target geographical region 104 of the request. Naturally, in such case, the other edge proxy server 106 will identify and determine accordingly that the target geographical region 104 of the request is the geographical region 104 in which it (i.e., the other edge proxy server 106) is deployed.

As seen in FIG. 5 illustrating the process 400, the certain edge proxy server 106 designated 106(1) deployed in the certain geographical region designated 104(1) may receive requests transmitted by or more client devices 110 located in the certain geographical region 104(1), for example, a client device 110A used by a respective user 112A and client device 110B used by a respective user 112B via the network 114 deployed in the certain geographical region 104(1).

It is assumed that the target geographical region of the user 112A is the certain geographical region 104(1) in which the certain edge proxy server 106(1) and one or more application servers 108, for example, an application server 108(1) are deployed. It is further assumed that the target geographical region of the user 112B is another geographical region 104 designated 104(2) in which another edge proxy server 106 designated 106(2) and one or more other application servers 108 designated 108(2) are deployed.

After authenticating each request received from the client device 110A used by the user 112A, the certain edge proxy server 106(1) executing he process 400 may determine, based on the geographical routing information extracted from the respective request, that the target geographical region of the respective request is the certain geographical region 104(1) and may therefore transmit the respective request to the application server 108(1) deployed in the certain geographical region 104(1). The path of the request(s) originating from the client device 110A is marked by the solid line.

However, after authenticating each request received from the client device 110A used by the user 112A, while analyzing the geographical routing information extracted from the respective request, the certain edge proxy server 106(1) may determine that the target geographical region of the respective request is the geographical region 104(2) and may therefore transmit the respective request to the other edge proxy server 106(2) deployed in the geographical region 104(2). The other edge proxy server 106(2) which may also execute the process 400, may determine that the target geographical region of the respective request originating from the client device 110B is the geographical region 104(2) and may thus transmit the respective request to the other application server 108(2). The path of the request(s) originating from the client device 110B is marked by the dashed line.

Optionally, since the respective request is already authenticated at the certain edge proxy server 106(1), the other edge proxy server 106(2) executing the process 400 may skip the step 404 and avoid re-authenticating the respective request.

As evident, each of the edge proxy servers 106 may be thus capable of receiving, authenticating and routing (forwarding) requests received directly from one or more of the client devices 110 and/or received from one or more other edge proxy servers 106, typically edge proxy servers 106 deployed in other geographical regions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the terms microservice, virtualization, container, container execution system, VPC, cloud intra-region network, and cloud inter-region network are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method of authenticating requests to a cloud service, comprising:
    using at least one processor of at least one edge proxy server deployed at an edge of cloud service facilitated by a container execution system for executing an authentication microservice configured for:
        receiving, via at least one network, at least one login request from at least one client device used by a respective user to establish a session with at least one application executed by at least one backend application server of the cloud service,
        transmitting the at least one login request to a login service executed by the at least one application server, the login service is configured to:
            authenticate the respective user based on credentials extracted from the at least one login request, and
            transmit at least one session token back to the at least one client device in case of successful authentication;
        extracting the at least one session token from each subsequent request received by the edge proxy server from the at least one client device pertaining to the session; and
        authenticating the respective subsequent request by verifying the at least one session token.

2. The method of claim 1, wherein the login service is integrated in the at least one application.

3. The method of claim 1, wherein the at least one session token comprises a json web token (JWT) inserted in a cookie embedded in a browsing application executed by the at least one client device for accessing the at least one application.

4. The method of claim 1, wherein the authentication microservice is configured to verify the at least one session token by verifying a cryptographic signature of the at least one session token created by the login service.

5. The method of claim 1, wherein the authentication microservice is further configured to enrich at least one subsequent request by inserting at least one additional data item to the at least one subsequent request.

6. The method of claim 5, wherein the at least one additional data item comprises geographical routing information relating to a target geographical region of the respective user, the geographical routing information is extracted from the at least one session token embedded in the at least one subsequent request.

7. The method of claim 6, wherein the container execution system further comprising a distributed container execution system comprising deployed to facilitate a multi-region cloud service, the distributed container execution system comprising:
a plurality of edge proxy servers deployed in a plurality of geographical regions to receive, via the at least one network, a plurality of requests to access the at least one application from a plurality of client devices,
and a plurality of application servers deployed in the plurality of geographical regions each communicatively coupled to at least one of the plurality of edge proxy servers deployed in the same geographical region,
wherein each edge proxy server is configured to perform the following for each subsequent request, after authenticated by the authentication microservice:
determine a target geographical region of each subsequent request based on the geographical routing information extracted from the respective subsequent request, and
transmit the respective subsequent request to at least one application server of the multi-region cloud service deployed in the geographical region of the edge proxy server in case the target geographical region is the geographical region of the respective edge proxy server, or
transmit the respective subsequent request to at least one other edge proxy server deployed in the target geographical region in case the target geographical region is not the geographical region of the respective edge proxy server, the at least one other edge proxy server is configured to transmit the at least one subsequent request to at least one application server deployed in the target geographical region.

8. The method of claim 7, wherein the respective edge proxy server is communicatively coupled to at least one of the plurality of application servers deployed in the same geographical region via at least one Virtual Private Cloud (VPC) network facilitated by the distributed container execution system.

9. The method of claim 7, wherein the respective edge proxy server is communicatively coupled to the at least one other edge proxy server deployed in a different geographical region via at least one peering connection facilitated by the distributed container execution system.

10. The method of claim 7, wherein each of the plurality of edge proxy servers is configured to determine a destination for transmitting the respective request based on at least one routing rule.

11. The method of claim 7, wherein the distributed container execution system is deployed using at least one cloud computing platform.

12. A container execution system deployed to facilitate a cloud service, comprising:
at least one edge proxy server deployed at an edge of a cloud service and at least one backend application server of the cloud service each comprising at least one hardware processor, the at least one hardware processor of the at least one edge proxy server is configured to execute an authentication microservice comprising:
code instructions to receive, via at least one network, at least one login request from at least one client device used by a respective user to establish a session with at least one application executed by at least one application server of the cloud service;
code instructions to transmit the at least one login request to a login service executed by the at least one application server, the login service is configured to:
authenticate the respective user based on credentials extracted from the at least one login request, and
transmit at least one session token back to the at least one client device in case of successful authentication;
code instructions to extract the at least one session token from each subsequent request received by the edge proxy server from the at least one client device pertaining to the session; and
code instructions to authenticate the respective request by verifying the at least one session token.

13. The container execution system of claim 12, wherein the login service is implemented by the at least one application.

14. The container execution system of claim 12, wherein the at least one session token comprises a json web token (JWT) inserted in a cookie embedded in a browsing application executed by the at least one client device for accessing the at least one application.

15. The container execution system of claim 12, wherein the authentication microservice is configured to verify the at least one session token by verifying a cryptographic signature of the at least one session token created by the login service.

16. The container execution system of claim 12, wherein the authentication microservice is further configured to enrich at least one subsequent request by inserting at least one additional data item to the at least one subsequent request.

17. The container execution system of claim 16, wherein the at least one additional data item comprises geographical routing information relating to a target region of the respective user, the geographical routing information is extracted from the at least one session token embedded in the at least one subsequent request.

18. The container execution system of claim 17, further comprising a distributed container execution system deployed to facilitate a multi-region cloud service, the distributed container execution system comprising:
a plurality of edge proxy servers deployed in a plurality of geographical regions to receive, via the at least one network, a plurality of requests to access the at least one application from a plurality of client devices,
and a plurality of application servers deployed in the plurality of geographical regions each communicatively coupled to at least one of the plurality of edge proxy servers deployed in the same geographical region, wherein each edge proxy server is configured to:
- determine a target geographical region of at least some of the plurality of requests based on the geographical routing information extracted from the at least one subsequent request, and
- transmit the at least one subsequent request to at least one application server of the multi-region cloud service deployed in the geographical region of the edge proxy server in case the target geographical region is the geographical region of the respective edge proxy server, or
- transmit the at least one subsequent request to at least one other edge proxy server deployed in the target geographical region in case the target geographical region is not the geographical region of the respective edge proxy server, the at least one other edge proxy server is configured to transmit the at least one subsequent request to at least one application server deployed in the target geographical region.

19. The method of claim 1, wherein the authentication microservice executed by the at least one edge proxy server is separate from the login service executed by the at least one application server such that the authentication microservice is not involved in the authentication of the respective user based on credentials extracted from the at least one login request and thus not exposed to data relating to the respective user.

20. The container execution system of claim 12, wherein the authentication microservice executed by the at least one edge proxy server is separate from the login service executed by the at least one application server such that the authentication microservice is not involved in the authentication of the respective user based on credentials extracted from the at least one login request and thus not exposed to data relating to the respective user.

* * * * *